United States Patent [19]

Arth et al.

[11] Patent Number: 4,763,687

[45] Date of Patent: Aug. 16, 1988

[54] FAUCET VALVE

[76] Inventors: Michael J. Arth, 21398 Stratford Ave., Rocky River, Ohio 44116; Raymond M. Arth, 3882 Savoy Dr., Fairview Park, Ohio 44126

[21] Appl. No.: 110,086

[22] Filed: Oct. 14, 1987

Related U.S. Application Data

[63] Continuation of Ser. No. 902,583, Sep. 2, 1986, abandoned.

[51] Int. Cl.⁴ .............................................. F16K 47/02
[52] U.S. Cl. .................................. 137/454.5; 251/118
[58] Field of Search ............... 137/625.3, 454.2, 454.5; 251/118, 121, 120, 123, 205

[56] References Cited

U.S. PATENT DOCUMENTS

| | | | |
|---|---|---|---|
| 2,649,273 | 8/1953 | Honegger | 251/118 X |
| 3,640,304 | 2/1972 | Fox | 137/454.2 X |
| 3,730,224 | 5/1973 | Prisk | 251/118 X |
| 3,789,870 | 2/1974 | Keller | 137/454.5 |
| 3,834,416 | 9/1974 | Parkison | 137/454.2 X |
| 3,974,853 | 8/1976 | Bently | 251/205 X |

FOREIGN PATENT DOCUMENTS 1015289 9/1957 Fed. Rep. of Germany ... 137/454.5

Primary Examiner—John Rivell
Attorney, Agent, or Firm—Watts, Hoffmann, Fisher & Heinke

[57] ABSTRACT

A cartridge-type valve assembly for controlling the flow of water to a plumbing fixture including a bonnet molded from a plastic material threadedly receiving a stem also formed of a plastic material. The bonnet defines a depending skirt having an inlet for receiving fluid and defining a sealing surface engageable by a sealing element preferably an O-ring, carried by the stem. Noise reducing structure preferably a plurality of flutes are formed in the bonnet, near the inlet and operate to reduce or inhibit noise in the valve as the sealing element moves into engagement with the sealing surface. The flutes open into the inlet and taper as they extend toward the sealing surface, gradually merging and blending into the sealing surface. The O-ring is replaceable thus eliminating the need for replacing the entire valve cartridge should a failure in the sealing element occur.

13 Claims, 3 Drawing Sheets

FAUCET VALVE

This application is a continuation, of application Ser. No. 902,583, filed 9/2/86 now abandoned.

TECHNICAL FIELD

The present invention relates generally to valving and in particular to a valve assembly for controlling the flow of water to a plumbing fixture such as a spigot.

BACKGROUND ART

Flow control valves used in plumbing are available in a variety of forms. In recent years, the trend has been to use cartridge-like assemblies which include a valving element as well as an associated valve seat. With this type of construction, the entire cartridge is considered disposable and is replaced when one of the elements is worn. Some of these units include an inexpensive valve body constructed of a moldable material such as plastic. A stem is rotatable within the valve body member and includes a tapered seat which coacts with a seating surface formed on the valve body to control the flow of water through the valve cartridge. An interference type engagement between the tapered valve seat and the valve body provides the necessary control function. An example of such a valve can be found in U.S. Pat. No. 3,789,870.

To provide the necessary sealing, flexure in the valve body when contacted by the tapered valve seat is required. In addition, it is believed that in order to provide the necessary longevity, the stem must be constructed from both a corrosion resistant and hard material such as brass. As a result, the overall valve construction can be expensive.

An all plastic construction has also been suggested in the prior art. For example, in U.S. Pat. No. 3,967,811 spring loaded sealing elements carried by a rotatable stem rotate into and out of alignment with flow passages. When aligned with the flow passages, water is allowed to proceed from an inlet, through the sealing elements and into a passage feeding a faucet or spigot. The fluid seal between the valve elements and the valve body is provided by springs which urge the elements into tight, confronting engagement with a sealing surface formed in the valve body. Surface irregularities in either the valve body or the sealing elements are likely to cause leakage. Moreover, foreign matter passing through the valve body can easily damage the sealing surfaces, necessitating replacement of the entire cartridge.

DISCLOSURE OF THE INVENTION

The present invention provides a new and improved cartridge type valve assembly which is relatively inexpensive. When a repair is necessary, the entire cartridge valve assembly can be replaced or alternatively a sealing element can be replaced and the rest of the cartridge retained. The cartridge includes structure for diminishing or eliminating the valve closing noise that would otherwise occur due to turbulence caused in the seal region as the sealing element reaches its closed position.

According to the preferred and illustrated embodiment, the cartridge valve assembly includes a bonnet defining a passage therethrough. One end of the passage communicates with an outlet for discharging fluid; the other end of the passage communicates with an inlet through which fluid is received.

Structure at the inlet defines a sealing surface engageable by a sealing element which is reciprocally movable towards and away from the sealing surface. In a preferred and illustrated embodiment, the sealing element comprises an O-ring carried by a stem which is threadedly received by the bonnet. The bonnet defines a skirt axially aligned with the O-ring. An inner, surface defined by the skirt forms the sealing surface engaged by the O-ring.

In accordance with the invention, notch-like recesses or flutes are spaced circumferentially, at locations around the inside of the skirt. The notches open into the inlet and gradually terminate and merge with the sealing surface. With the disclosed construction, closure noise normally generated during closing of the valve element is substantially reduced or eliminated. The recesses or flutes insure that the termination of the flow is gradual and reduce the occurrences of fluttering or other uncontrolled, noise generating movement in the O-ring as it moves towards the sealing surface. With the preferred construction "water hammer" is substantially reduced or eliminated.

In the preferred construction, components that comprise the cartridge assembly, namely the stem and bonnet, are molded from a suitable plastic such as Celcon. Very few, if any, final machining operations are necessary to produce the final component. More importantly, molding of the bonnet is preferred. In the preferred molding process, the recesses or flutes are formed in the sealing skirt and do not require additional machining steps. In fact, in the preferred and illustrated embodiment, all the valve components are molded to their finished dimension and no machining operations are necessary. By molding the flutes, sharp corners or other wear producing surfaces are reduced thus increasing the life of the O-ring seal.

The present invention then provides a relatively inexpensive cartridge valve assembly which provides a positive and reliable sealing arrangement for controlling water flow. Unlike many prior art constructions, should the sealing element, i.e., O-ring be damaged, it can be easily replaced without replacing the entire assembly. Recesses formed in the sealing skirt reduce or inhibit turbulence-induced noise that would otherwise render the construction annoying or unacceptable, for residential use.

Additional features of the invention will become apparent and a fuller understanding obtained by reading the following detailed description made in connection with the accompanying drawings.

BRIEF DESCRIPTION OF DRAWINGS

FIG. 3 is a bottom view of the valve stem and bonnet shown in FIGS. 1 and 2, illustrated in their assembled positions; and, FIG. 4 is a perspective view, partially in section, of a portion of a faucet assembly showing the valve cartridge of the present invention in its installed position.

BEST MODE FOR CARRYING OUT THE INVENTION

Figure 4:
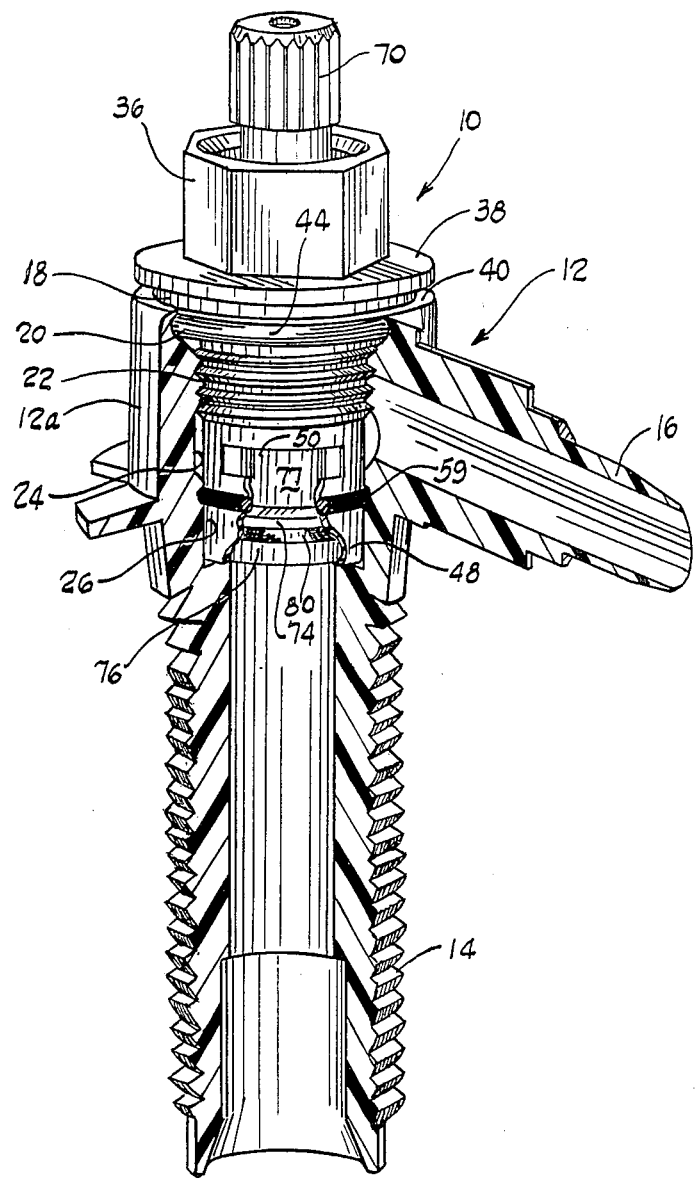

FIG. 4 illustrates the overall construction of a valve cartridge 10 that is shown mounted in a housing 12 which forms part of a faucet unit. As is known, the faucet unit includes a threaded inlet pipe 14 which is connected to a water supply, (not shown). The valve cartridge 10 controls the communication of fluid in the inlet pipe 14 with an outlet conduit 16. Water in the inlet conduit 16 is communicated to a faucet mixing chamber (not shown), as is known. The housing 12 is considered conventional and does not form part of the present invention.

Figure 1:
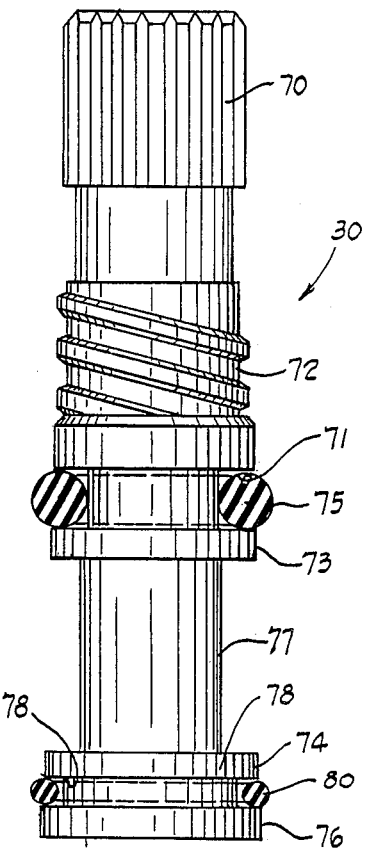
FIG. 1 is an enlarged, side elevational view of a valve stem forming part of the present invention.
Figure 2:
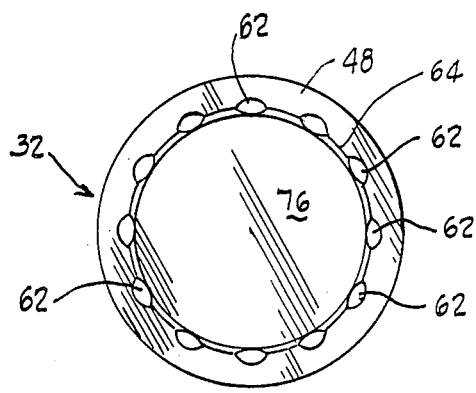
FIG. 2 is a sectional view of a bonnet, shown in reduced size as compared to FIG. 1, forming part of the present invention.
Figure 2:
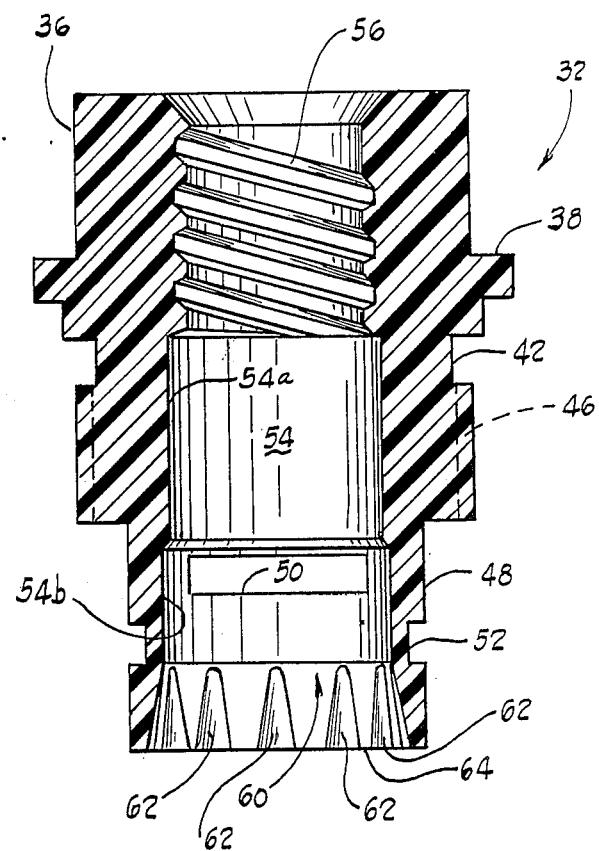

The valve cartridge 10 is threadedly received by a main housing section 12a. The main housing 12a defines a recess that extends downwardly from an end opening 18. The recess includes an enlarged diameter portion 20, a threaded portion 22, a clearance portion 24 and a stepped portion 26. The portion 26 tapers slightly from the top to the bottom (as viewed in FIG. 4). Referring to FIGS. 1 and 2, the valve cartridge 10 comprises a stem member 30 that is threadedly received by a bonnet 32. In the preferred embodiment, both members are formed from a plastic material such as Celcon. The bonnet includes a hexagonal shaped, integrally formed, nut portion 36 which is adapted to be engaged by an installation tool such as a wrench which is used to rotate and tighten the bonnet into the housing 12. An integral flange 38 is formed below the nut portion and is adapted to seat against an end face 40 formed on the top of the main housing 12. An O-ring groove 42 is formed below the flange 38 and receives an O-ring 44 (shown only in FIG. 4).

A threaded portion 46 is formed below the O-ring groove 42. A substantially uniform diameter segment or skirt 48 extends downwardly from the threaded portion 46. The skirt 48 is interrupted by two transversely elongated outlet apertures 50 (only one is shown in FIG. 4) and an O-ring groove 52 disposed below the aperture 50.

When the valve cartridge 10 is installed in the main housing 12, the outside of the bonnet 32 engages portions of the recess formed in the main housing. In particular, the O-ring 44 carried by the bonnet sealing engages the enlarged diameter portion 20 and prevents fluid leakage out of the housing. The threaded portion 46 is threadly received by the threaded portion 22. An O-ring 59 carried by the O-ring groove 52 (formed in the skirt 48) sealingly engages the tapered portion 26 of the housing 12. The O-ring 59 isolates the inlet side of the valve 10 from the outlet side. When the bonnet 32 is installed, the outlet apertures 50 are substantially aligned with the clearance region 24 formed in the main housing. The clearance region 24 communicates with the outlet conduit 16.

The bonnet 32 defines an internal throughbore 54. Referring to FIG. 2, the upper end of the bore includes threads 56. A uniform diameter bore portion 54a extends downwardly from the threads 56 and opens into a slightly larger diameter bore portion 54b. The outlet apertures 50 communicate with the larger diameter portion 54b. At the base of the bore portion 54b, sealing structure is defined, which in a preferred embodiment comprises a substantially cylindrical sealing surface, indicated generally by the reference character 60 located a spaced distance above an end opening 64 which defines an inlet to the valve. Just below the sealing surface 60, a plurality of notch-like recesses or flutes 62 are defined.

In accordance with the preferred embodiment, the flutes 62 open into the inlet 64 and gradually taper as they extend towards the sealing surface 60. In effect, the flutes gradually merge with the sealing surface 60.

The stem 30 is received in the bore 54. In particular, the stem 30 includes a knurled segment 70 adapted to receive a suitable operating knob (not shown). A threaded segment 72 is cooperatively and loosely received by the threads 56 formed in the bonnet such that rotation of the stem causes it to reciprocate vertically (as viewed in FIG. 2) with respect to the bonnet 32, depending on the direction of rotation. An O-ring groove 71 is defined between the base of the threaded segment 72 and a spaced integrally molded flange 73. A replaceable O-ring 75, carried by the groove 71, sealingly engages the inside of the bore portion 54a and inhibits fluid leakage between the stem 30 and the bonnet 32. A uniform diameter segment 77 extends downwardly from the flange 73.

The stem 30 is preferably molded from a plastic material such as Celcon. A pair of spaced apart flanges 74, 76 is formed at the base of the stem 70, the flange 74 preferably being smaller in diameter than the flange 76. An O-ring groove 78 is defined between the flanges 74, 76 and carries a suitable elastomeric O-ring 80. The stem segment 77 is smaller in diameter than both the flanges 72 and 74 and defines a fluid passage between itself and the bore portions 54a, 54b.

Referring also to FIG. 4, when the stem 30 is mounted in its operative position in the bonnet 32, the O-ring 80 is vertically movable towards and away from the sealing surface 60. With the threaded arrangement shown, when the stem is rotated in the counterclockwise direction, the base of the stem moves downwardly (as viewed in FIG. 4). Water in the inlet pipe 14 is allowed to enter the inlet opening 64 and proceed past the base of the stem 30 and into the bore portion 54b. The O-ring 75 prevents the water from proceeding upwardly and forces the water to travel out the apertures 50 and into the outlet conduit 16 by way of the clearance region 24 formed in the main housing 12. Clockwise rotation moves the base of the stem upwardly and causes the O-ring 80 to engage the sealing surface 60 and terminate the flow of water.

In the preferred construction, the extremes of reciprocating movement in the stem 30 is selected such that the O-ring 80 is confined within the skirt 48 at all times. Although the valve cartridge 10 can be configured to allow the O-ring 80 to extend below the inlet 64 at the fully opened position, it is believed that with the preferred construction better control and increased seal longevity is realized.

Referring also to FIG. 3, the flutes 62 spaced around the inner periphery of the base of the skirt 48, reduce or inhibit noise as the O-ring 80 engages the sealing surface 60. As seen best in FIG. 3, the flutes 62 allow water to proceed past the O-ring 80 as the O-ring moves toward the sealing surface 60. The flutes 62 are shaped so that they taper and gradually merge with the sealing surface 60. As a result, the flow through the inlet is gradually terminated as the O-ring 80 engages the sealing surface and noise is minimized.

In the illustrated embodiment, twelve (12) flutes or recesses are formed on the inside of the skirt 48. It should be understood that the number of flutes can be varied to suit a particular application.

In the preferred embodiment, both the bonnet and stem are molded and do not require substantial machining to complete their construction. In fact, in the most preferred embodiment, the flutes are molded to their final dimension and no additional machining of the flutes is required. With this construction, sharp corners or other irregular, O-ring abrading surfaces are eliminated and hence the life of the O-ring seal is increased.

It should also be apparent that, should a failure in the O-ring 80 (or for that matter the O-ring 44, 59 or 75) occur, the entire valve cartridge 10 does not have to be replaced. Instead, the cartridge is removed from the main housing 12 using a suitable tool to release the threaded engagement between the threads 46 formed on the bonnet 32 and the threads 22 formed in the housing 12. Once the cartridge is removed, the stem 30 is threaded out of the bonnet 32 to expose the O-ring 80 which is then easily replaced.

The present invention provides an inexpensive but reliable valve cartridge which does not require complete replacement when the sealing element fails. In addition, closure noise caused by movement or fluttering of the O-ring is substantially reduced or eliminated by providing structure which gradually reduces flow as the O-ring 80 reaches its sealing position.

Although the invention has been described with a certain degree of particularity, it should be understood that those skilled in the art can make various changes to it without departing from the spirit or scope of the invention as hereinafter claimed.

We claim:

1. A valve assembly, comprising:
   (a) a bonnet including:
      (i) structure defining an axial passage therethrough, a portion of said passage defining an outlet for discharging fluid;
      (ii) said bonnet further defining an inlet spaced from said outlet through which fluid is received;
   (b) a valving member for controlling fluid flow between said inlet and said outlet, said member including a sealing element engageable with a substantially cylindrical sealing surface defined by said passage, located near said inlet;
   (c) said bonnet further defining a skirt at said inlet including a plurality of flutes on the inside of said skirt, said flutes gradually tapering towards said sealing surface and having their inner ends terminating and merging with said substantially cylindrical sealing surface such that as said sealing element of said valving member moves past said flutes, said fluid flow toward said outlet is gradually terminated whereby closure noise caused by turbulence at said inlet is inhibited.

2. The valve of claim 1 wherein a portion of said passage is threaded and threadedly engageable with complementally formed threads on said valving member such that rotation of said valving member produces axial movement of said sealing element towards and away from said sealing surface defined by said passage.

3. The apparatus of claim 2 wherein said sealing element comprises an elastomeric O-ring.

4. The apparatus of claim 1 wherein said axial passage therethrough comprises a throughbore and said outlet is radially oriented with respect to the axis of said throughbore.

5. A valve assembly, comprising:
   (a) a bonnet integrally molded from a plastic material;
   (b) a stem threadedly engageable with said bonnet;
   (c) said bonnet including a depending skirt defining an inlet opening and a bore extending from said inlet opening to at least one outlet opening defined by said bonnet;
   (d) said skirt further defining:
      (i) structure for inhibiting closure noise comprising tapering recesses spaced circumferentially around said bore, one end of each of said recesses opening into said inlet and another end of each of said recesses merging with a substantially cylindrical sealing surface; and,
      (ii) said substantially cylindrical sealing surface engageable by sealing structure on said stem, said substantially cylindrical sealing surface and sealing structure cooperating to inhibit fluid flow from said inlet to said outlet when said stem is in a closed position;
   (e) said bonnet defining mounting structure for removably mounting said valve in a housing.

6. The valve of claim 5 wherein said sealing structure comprises an O-ring carried by said stem, said O-ring movable by said stem in an axial direction from a first position at which said O-ring is spaced below said sealing surface but confined within said skirt and a second position at which said O-ring is in sealing engagement with said sealing surface.

7. The valve of claim 6 wherein said first position of said O-ring defines an open position for said valve and said second position defines a closed position for said valve.

8. The apparatus of claim 5 wherein said noise inhibiting structure comprises twelve recesses formed near the inlet.

9. The valve of claim 5 wherein said stem is molded from a plastic material.

10. The apparatus of claim 5 wherein said recesses comprise flutes integrally molded in said bonnet which do not require further machining or process steps.

11. A valve assembly, comprising:
    (a) a bonnet including structure defining a passage therethrough, one end of said passage defining a port for receiving fluid, another end of said passage defining another port for discharging fluid;
    (b) a valving member for controlling fluid flow between said ports, said member including a sealing element engageable with a substantially cylindrical sealing surface defined by said passage located near one of said ports;
    (c) said bonnet further defining a skirt at said one port including a plurality of flutes on the inside of said skirt, said flutes gradually tapering toward said substantially cylindrical sealing surface and having their inner ends terminating and merging with said substantially cylindrical sealing surface such that as said sealing element of said valving member moves past said flutes, said fluid flow between said ports is gradually terminated whereby closure noise caused by turbulence at the one port is inhibited.

12. A valve assembly, comprising:
    (a) a bonnet including:
       (i) structure defining an axial passage therethrough, a portion of said passage defining an outlet for discharging fluid;
       (ii) said bonnet further defining an inlet spaced from said outlet through which fluid is received;
    (b) a valving member for controlling fluid flow between said inlet and said outlet, said member including a sealing element engageable with a sealing surface defined by said passage, located near said inlet;
    (c) said bonnet further defining a skirt at said inlet including a plurality of flutes on the inside of said skirt, said flutes gradually tapering towards said sealing surface and having their inner ends terminating and merging with said sealing surface, said flutes having cross sections that decrease in the direction of fluid through said passage such that as said sealing element of said valving member moves past said flutes, said fluid flow toward said outlet is gradually terminated whereby closure noise caused by turbulence at said inlet is inhibited.

13. The valve of claim 12 wherein said sealing surface is substantially cylindrical.

* * * * *